United States Patent [19]

Wilwerding

[11] Patent Number: 4,481,413
[45] Date of Patent: Nov. 6, 1984

[54] STRIP MIRROR RADIATION SPLITTER FOR RANGE DETERMINATION SYSTEMS

[75] Inventor: Dennis J. Wilwerding, Littleton, Colo.

[73] Assignee: Honeywell Inc., Minneapolis, Minn.

[21] Appl. No.: 393,939

[22] Filed: Jun. 30, 1982

[51] Int. Cl.³ ............................ G01J 1/36; G03B 7/08
[52] U.S. Cl. .................................... 250/204; 354/406
[58] Field of Search .............. 250/204, 201, 578, 209; 354/402, 404, 406–409; 356/4

[56] References Cited

U.S. PATENT DOCUMENTS

| | | |
|---|---|---|
| 4,160,587 | 7/1979 | Heiniger et al. ................. 354/406 X |
| 4,185,191 | 1/1980 | Stauffer . |
| 4,230,942 | 10/1980 | Stauffer . |
| 4,264,810 | 4/1981 | Utagawa et al. .................... 250/204 |
| 4,352,545 | 10/1982 | Uno et al. ........................ 250/204 X |

Primary Examiner—Edward P. Westin
Attorney, Agent, or Firm—Charles J. Ungemach

[57] ABSTRACT

A totally reflecting strip mirror is utilized in a zoom lens system having an auto focus circuit replacing the partially reflective large mirror of the prior art to provide the same amount of radiation to the auto focus system with less waste, easier adjustment, and decreasing the necessary dimensions of the zoom lens system.

2 Claims, 5 Drawing Figures

STRIP MIRROR RADIATION SPLITTER FOR RANGE DETERMINATION SYSTEMS

BACKGROUND OF THE INVENTION

In the art of range determination systems and, more particularly, the art of auto focus cameras, it is often desirable that radiation being received from a remote object pass through the taking lens of the camera where it is split into two portions. The first, and usually major portion of the radiation, passes to the film or to the electronics of the video camera; while the other portion of the light is directed to the auto focus circuitry to produce a signal indicative of the focus condition of the camera lens. Systems of this type may be seen, for example, in Stauffer U.S. Pat. No. 4,185,191, issued Jan. 22, 1980.

It is common in the prior art systems to employ a partially silvered mirror in the optical path so as to direct about twenty percent of the radiation to the auto focus circuitry, while passing about eighty percent of the radiation to the image plane of the camera. It is desirable to maximize the amount of radiation that passes through to the camera image plane and accordingly, efforts have been made in the past to increase the efficiency of the auto focus detectors by shaping them so as to occupy as much of the image of radiation at the detection plane as possible. As is seen, for example, in Stauffer U.S. Pat. No. 4,230,942, issued Oct. 28, 1980 and assigned to the assignee of the present invention, the detectors may have their corners clipped to approximate a semicircle and the radiation image may be distorted to form an oval pattern. Shaping the detectors to fit within the radiation image or altering the image to extend the area thereof has, however, required additional effort and equipment and has created problems with respect to positioning and adjustment because the radiation image and the detector pairs have to be adjusted extremely carefully in order to maximize the radiation used. Because of this difficulty, a compromise is usually reached where the size of the radiation image is increased so that the detector pairs can more easily fit within the confines thereof, but in doing so, additional radiation is wasted resulting in less radiation being available for exposing the camera film or video camera circuitry.

Finally, when utilizing zoom lenses, for example, in motion picture or video cameras, a problem arises due to the fact that the partially silvered mirror must be placed between the afocal zoom portion of the lens, and the master lens. The length of the partially-silvered mirror unnecessarily increases the length of the zoom lens in an undesirable fashion.

SUMMARY OF THE INVENTION

The apparatus of the present invention utilizes a substantially fully-reflecting strip mirror in place of the partially-reflecting mirror of the prior art, so as to pass to the auto focus circuitry a relatively narrow, elongated strip image of the exit pupil, rather than the circular image heretofore utilized. This strip image falls across equal portions of both of the detectors in each pair, at such a position that the extremely careful adjustments of the prior art need not be made. Furthermore, since radiation travelling to the auto focus circuitry is in the form of a rectangular strip, the amount of waste radiation is considerably less and accordingly, more of the radiation can pass to the film or video electronics as desired. Furthermore, the detectors no longer have to be shaped so as to occupy a major portion of a circular image and thus, may be more easily manufactured. Finally, by using a fully reflecting strip mirror, the distance occupied between the afocal zoom lens and the master lens in a zoom lens system is considerably smaller so that the zoom lens may be made shorter as is desired.

DETAILED DESCRIPTION OF THE PREFERRED EMBODIMENT

Figure 1:
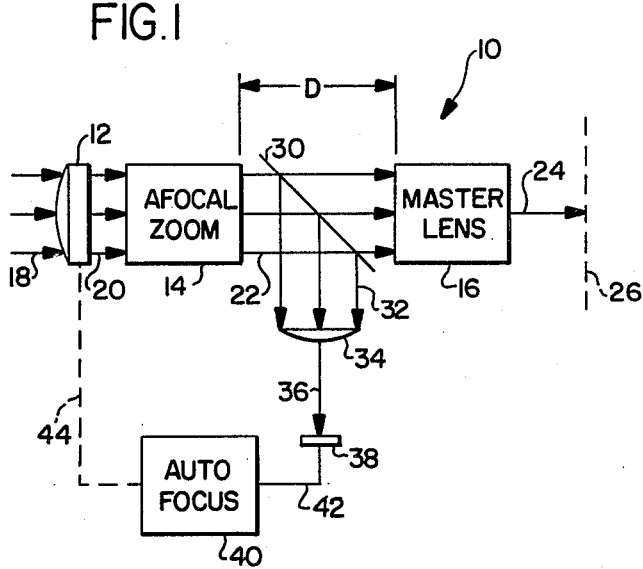
FIG. 1 shows a schematic representation of an auto focus system, utilizing a zoom lens in the prior art.

FIG. 1 shows a zoom lens system 10, comprising a focus lens 12, an afocal zoom lens 14 and a master lens 16 arranged to receive radiation from along a path such as shown by arrows 18, 20, and 22; and to produce an image along a path shown by arrow 24 on an image plane 26, which may be the film plane of a still or motion picture camera, or the detector plane of a video camera.

In order that the focus lens 12 be positioned at the proper distance to create a focused image on the plane 26, the prior art has inserted a partially-silvered mirror 30 at a 45-degree angle between the afocal zoom lens 14 and the master lens 16 so as to direct radiation along a path such as is shown by arrow 32, to a lens 34, and thereafter, along a path such as is shown by arrow 36, to the detector array 38 of an auto focus circuit 40. The output of the detectors on the array 38 is presented to the auto focus circuit 40 by a conductor 42, and the auto focus circuit operates to produce an output shown as a mechanical connection 44, which positions the focus lens 12 of the zoom system 10 at a proper position to cause the image on plane 26 to be in focus.

The partially silvered mirror 30 is usually made so that enough of the available radiation passes to the auto focus detector 38 to enable it to work, while the remainder of the radiation passes to the master lens 16. It is seen in FIG. 1 that the placement of the mirror 30 at a 45-degree angle between the afocal zoom lens 14 and the master lens 16 requires a distance "D" to be utilized. It is also known that the distance "D" should be minimized in order to make the overall zoom lens length reasonably small.

Figure 2:
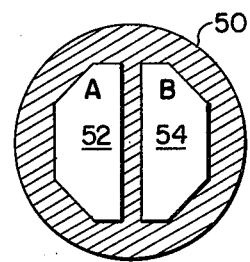
FIG. 2 shows the arrangement of the detectors within the radiation image for the apparatus of FIG. 1.

FIG. 2 shows an image 50 representing the radiation transmitted by the mirror 30 and lens 34 to the detector array 38. The detector array 38 comprises a plurality of detection pairs, one of which is shown in FIG. 2 by reference numerals 52 and 54, representing detectors A and B. As is discussed in the above mentioned U.S. Pat. No. 4,230,942, in order to have the greatest output from detectors A and B, they should be shaped so as to fit within the circular image 50; and accordingly, in FIG. 2, the detectors are shown as portions of octagons sized so as to fit fairly closely within the circular image 50. In order to prevent great difficulty in adjusting the system, however, the image 50 is necessarily somewhat larger than the detectors A and B, and the cross-hatched area within the circular area 50 is therefore representative of radiation which is wasted and is not used by the detectors A and B. It is desirable to minimize the amount of wasted radiation, since to do so will increase the amount of radiation that can pass in FIG. 1 from the afocal zoom lens 14 to the master lens 16.

Figure 3:
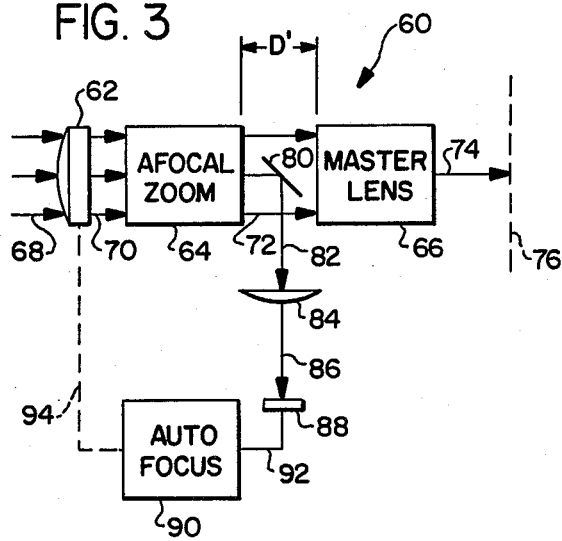
FIG. 3 shows a schematic representation of an auto focus system utilizing a zoom lens and employing the strip mirror of the present invention.

FIG. 3 shows the present invention wherein a zoom lens 60 has a focus lens 62, an afocal zoom lens 64 and a master lens 66 operable, as the elements were in FIG. 1, to direct radiation from a remote object along a path such as is shown by arrows 68, 70, 72 and 74 to a detection plane 76 which may be the filmplane of a still or motion picture camera or the detectors of a video camera.

In FIG. 3, a small substantially fully-reflecting strip mirror 80 is shown substituted for the large partially silvered mirror 30 of FIG. 1. Strip mirror 80 is rectangular in shape, and its long dimension extends into the plane of the paper in FIG. 3. Radiation is reflected from mirror 80 downward along a path shown by arrow 82 to a lens 84, and along a path shown by arrow 86 to a detector array 88 in a manner similar to that shown in FIG. 1. The detector array 88, like array 38 of FIG. 1, consists of a plurality of detector pairs which produce outputs to an auto focus circuit 90, along a conductor 92. The output of auto focus circuit 90 is shown as a mechanical connection 94 being connected to the focus lens 62 so as to position it at the correct position to create a focused image on the detection plane 76. It should be noted that the distance between the afocal zoom lens 64 and the master lens 66 indicated in FIG. 3 as "D'", is considerably smaller than the distance "D" shown in FIG. 1. This advantage occurs since the mirror now occupies much less space between the afocal zoom lens 64, and the master lens 66 allowing the two to be moved closer together.

Since the mirror is substantially totally-reflecting, none of the light passing to the mirror 80 reaches the master lens 66, but all of the light around the mirror 80 is passed on to master lens 66. By adjusting the size of the totally-reflecting mirror 80, it is seen that, whatever percentage of light required, may be transmitted down to the auto focus detectors with the remainder passing to the master lens 66. If, for example, twenty percent of the light from the remote object is desired for the auto focus detectors, then the strip mirror 80 should be made to block twenty percent of the cross-sectional area of light between the zoom lens 64 and the master lens 66. Furthermore, as will be described hereinafter, the adjustment of the position of the detectors with respect to the radiation image transmitted by the mirror 80 is less critical and less of the radiation will be wasted. Accordingly, the auto focus circuitry can operate on a smaller amount of light than was required in FIG. 1 and thereby the amount of light passing through to master lens 66 is increased.

Figure 4:
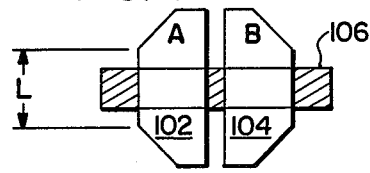
FIG. 4 shows the arrangement of the detectors and the strip radiation image of the present invention.

FIG. 4 shows the detectors A and B of FIG. 2 by reference numerals 102 and 104 respectively. In FIG. 4, the image of the radiation being reflected by the mirror 80 is shown as a rectangular strip 106 falling across the central portion of the detectors A and B. It is seen that Image 106 falls between the cutoff corners of detectors A and B, as is seen in FIG. 4 by the distance "L". Accordingly, all that is necessary for the detectors A and B to receive the proper amount of radiation is that the image 106 lie somewhere in the distance L so it is seen that the difficulty of close adjustment is reduced. While, in FIG. 4, the area of radiation to which detectors A and B are exposed is less than in FIG. 2, the amount of radiation they receive is as great or greater because mirror 80 in FIG. 3 is substantially totally reflective while mirror 30 in FIG. 1 reflects only about twenty percent of the radiation. Furthermore, it is seen in FIG. 4 that the cross-hatched area representing that amount of radiation which is wasted is now considerably reduced from that shown in FIG. 2, and accordingly, more of the radiation can pass through to the master lens 66 in FIG. 3 than was the case in FIG. 1.

Figure 5:
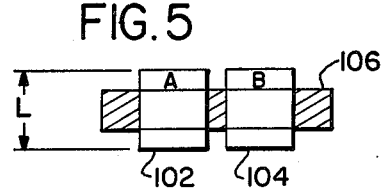
FIG. 5 shows the strip image of the present invention utilizing more conveniently formed detectors than that of FIG. 4.

FIG. 5 shows the same arrangement as FIG. 4, except that detectors A and B are now shown to be, themselves, square or rectangular which is a configuration easier to manufacture than the octagonal configuration of FIG. 4. With the configuration of FIG. 5, the detectors still receive the same amount of radiation as the detectors in FIG. 4, with the same amount of lost radiation involved, but the whole arrangement is easier to manufacture.

It is therefore seen that I have provided a novel way of constructing an auto focus camera to reduce the amount of lost radiation while taking up less space and allowing easier manufacturing and adjustmenting procedures to be employed. It should be understood that many changes and modifications to the apparatus shown in the preferred embodiment will be obvious to those skilled in the art and accordingly, I do not wish to be limited to the structures specifically shown in connection with the description of the preferred embodiments. I intend only to be limited by the following claims.

I claim:

1. Apparatus for use with a range finding system which includes a moveable lens operable to direct a beam of radiation from a remote object along a first optical path to an image plane, the beam having a cross-sectional area at a predetermined location along the first optical path and the system further including radiation detection means which comprises a pair of radiation detectors having a first area, the radiation detection means operable to provide an output indicative of the range to the remote object, the improvement comprising:

reflecting means comprising a single strip mirror having greater length than width mounted at the predetermined location and sized with the width smaller than the cross-sectional area so as to substantially, totally reflect only a predetermined portion of the radiation along a second optical path to the pair of radiation detectors, the reflected radiation falling on the detectors in substantially a rectangle where the length is great enough to extend over both detectors and where the width is less than the width of the detectors so that the radiation covers a second area on the detectors which is less than the first area.

2. Apparatus for use in a range finding system for a zoom lens having an afocal lens and a master lens, the system including a moveable lens operable to direct a beam of radiation from a remote object along a first path through the afocal lens and the master lens to an image plane, the beam having a cross-sectional area at a predetermined location between the afocal lens and the master lens, the improvement comprising:

reflecting means comprising a single strip mirror having a greater length than width mounted at the predetermined location with the mirror slanted along its width from a point nearer the afocal lens to a point nearer the master lens so that the distance between the afocal lens and the master lens can be minimized, the mirror being sized with its width smaller than the cross-sectional area so as to substantially, totally reflect only a predetermined portion of the radiation along a second optical path; and radiation detection means mounted in the second optical path and operable to provide an output indicative of the range to the remote object.

* * * * *